Jan. 26, 1926. 1,570,649
G. D. SUNDSTRAND
AUTOMATIC LATHE
Filed July 7, 1923   2 Sheets-Sheet 1

FIG. 1ª

Inventor
G. D. Sundstrand

Jan. 26, 1926.  1,570,649
G. D. SUNDSTRAND
AUTOMATIC LATHE
Filed July 7, 1923   2 Sheets-Sheet 2
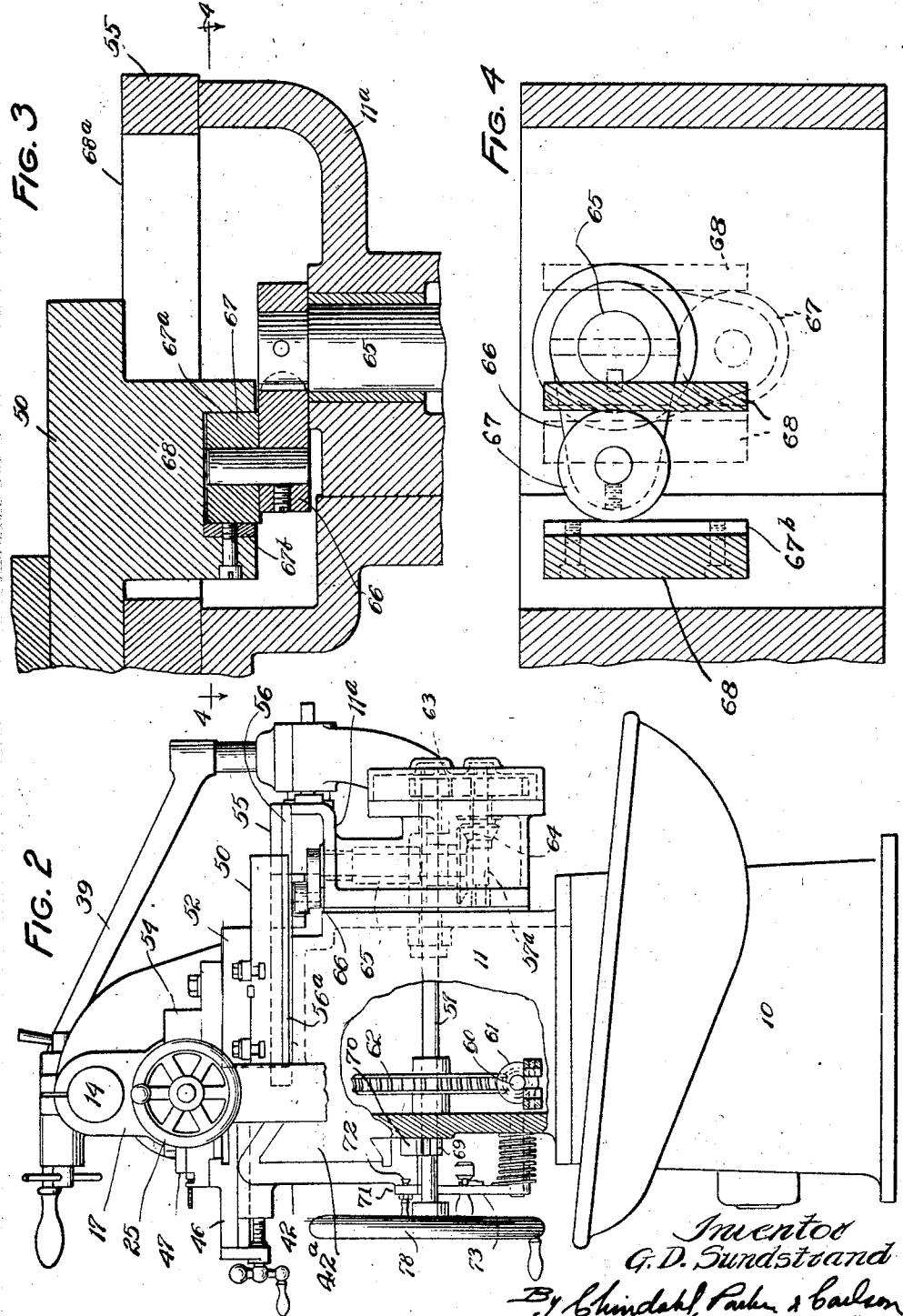
Inventor
G. D. Sundstrand
By Chindahl, Parker & Carlson
Attys Patented Jan. 26, 1926.

1,570,649

UNITED STATES PATENT OFFICE.

GUSTAF DAVID SUNDSTRAND, OF ROCKFORD, ILLINOIS, ASSIGNOR TO ROCKFORD TOOL COMPANY, OF ROCKFORD, ILLINOIS, A CORPORATION OF ILLINOIS.

AUTOMATIC LATHE.

Application filed July 7, 1923. Serial No. 650,172.

*To all whom it may concern:*

Be it known that I, GUSTAF DAVID SUNDSTRAND, a citizen of the United States, residing at Rockford, in the county of Winnebago and State of Illinois, have invented a certain new and useful Automatic Lathe, of which the following is a specification.

The invention relates to lathes of a type which is particularly adapted for use in the manufacture of parts upon which a relatively large number of machining operations must be performed, and has especial reference to lathes which are adapted to perform a number of operations simultaneously.

The object of the invention, generally stated, is to provide a carriage feeding mechanism of an extremely simple character so that it can be manufactured at a relatively low cost; which operates within a small radius to effect a relatively large movement; and which is at all times connected to the carriage so as positively to move it in one direction or the other.

Another object is to produce a feed mechanism for the rear tool carriage of a lathe, in which the connection between the carriage slide and the source of power is located intermediate the ends of the slide, with the extreme rear end of the slide supported by the slideway.

A further object of the invention is to provide in a lathe of the character indicated, a feed mechanism for the rear tool carriage, which is adapted to move the carriage initially at a relatively high speed and finally at a low speed whereby to provide a rapid feeding movement for a facing tool arranged to be engaged with the work during the initial portion of the carriage movement, and to move a turning tool into engagement with the work at a low speed during the final portion of the carriage movement.

Still another object of the invention is to provide in a lathe of this character a means of a simplified character for supporting the work with sufficient rigidity to enable the accurate performance thereon of a plurality of separate operations.

For convenience I have herein shown and will describe my invention as applied to the machining of an internal combustion engine piston, although it will be apparent that the invention is capable of wide application, being especially adapted for use in machining such parts as universal joint crosses, bushings, rings of various types, small fly wheels, pulleys, gear blanks and similar small parts upon which a large number of operations must be performed.

Figure 1:
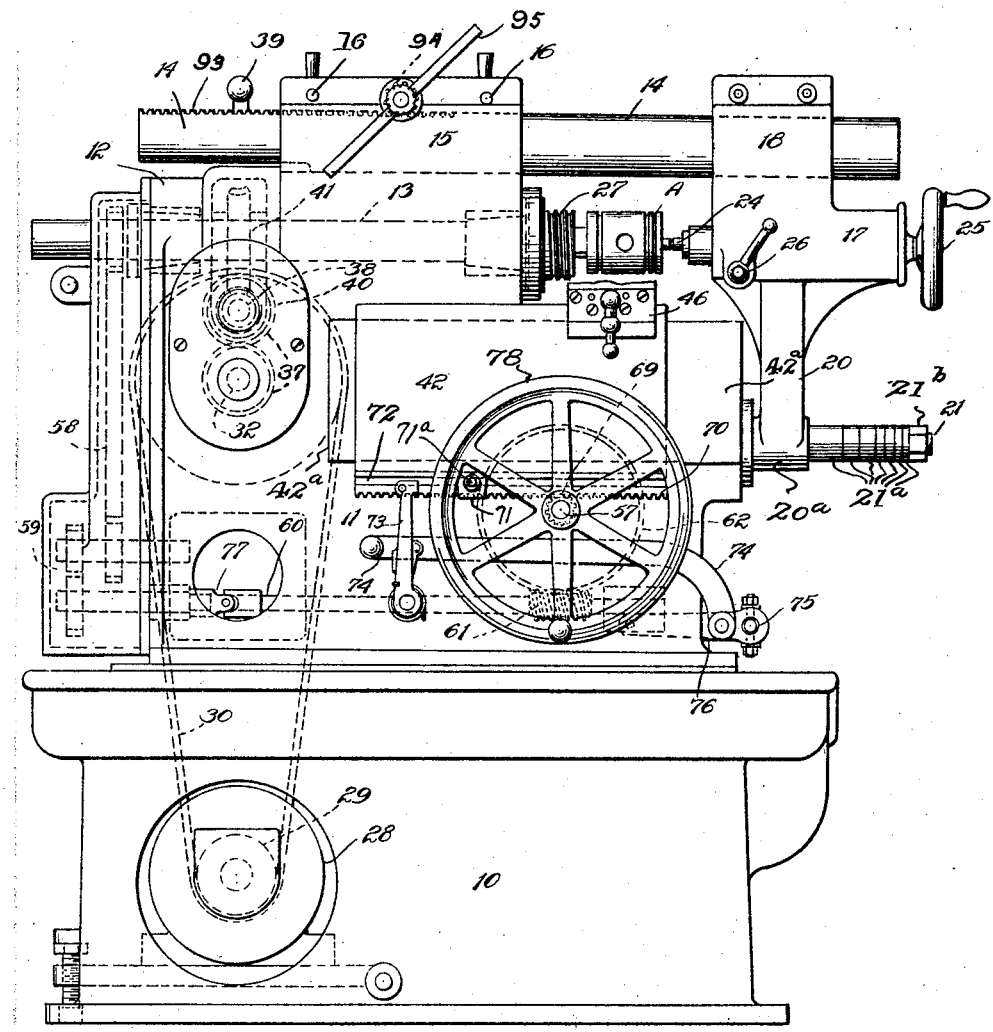
Figure 1:
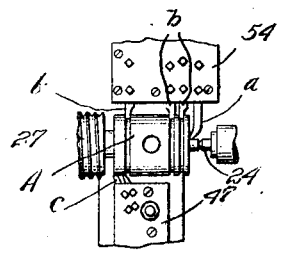

Figure 1 of the drawings is a front elevational view of a lathe embodying my invention. Fig. 1ª is a fragmentary plan view showing the facing and turning tools. Fig. 2 is an end view of a lathe constructed in accordance with my invention, a portion being broken away to show a detail of construction. Fig. 3 is a fragmentary vertical sectional view on an enlarged scale illustrating my improved feeding mechanism as applied to a rear tool carriage. Fig. 4 is a horizontal sectional view taken in the plane of line 4—4 of Fig. 3.

The lathe comprises a hollow base 10 upon which is supported a body 11 of substantial height at one end, forming in effect a column, and lower at its other end to form a bed. The upper portion of the column forms a stationary headstock 12 in which a work-supporting spindle 13 is journalled, and above the spindle is mounted a shaft 14 which extends longitudinally over the bed. This shaft is made of substantial size, forming a rigid overarm, and is securely clamped in the extreme upper end of the column by means of a split bearing 15 formed integral with the headstock and having clamping bolts 16.

At the opposite end of the bed I provide a tailstock 17 which is so mounted as to constitute a connection between the overarm and the lathe bed. Thus the tailstock has in its upper portion a split bearing 18 equipped with clamping bolts 19 whereby the tailstock may be rigidly clamped upon the overarm. Also the tailstock has a depending portion 20 which is adjustably mounted upon a stud 21 projecting outwardly from the bed. The stud 21 is of sufficient length to allow for any necessary adjustment of the tailstock. 21ª are spacer sleeves or collars which may be placed on the stud 21 at either or both sides of the hub 20ª of the tailstock. 21ᵇ is a nut on the outer end of the stud 21 for clamping said hub and the series of spacer sleeves against the end of the bed. This construction while providing an effectual support for the tailstock also provides a support for the free end of the overarm. The tailstock may be provided with a center 24 adjustable in the usual way by means of a hand wheel 25 and arranged to be locked by the clamping screw 26.

The spindle 13 may be provided with suitable means for holding the work A, herein shown as a piston. I have shown in the present instance for this purpose a chuck 27 of a well known character.

Enclosed within the base 10 is an electric motor 28 which I prefer to employ as the source of power. This motor is connected with the spindle 13 by means of a pulley 29, a belt 30, a pulley 31 mounted upon a shaft 32, and a pair of intermeshing gears 37. One of these gears is fastened upon the shaft 32 and the other is mounted upon a parallel shaft 38 which also carries a worm 40 meshing with a worm wheel 41 fast upon the spindle 13. A suitable shifting clutch (not herein shown) having an operating handle 39 (Fig. 2) may be interposed between the pulley 31 and its driving connection with the spindle.

Movable longitudinally of the lathe bed, in a direction parallel to the spindle, is a front tool carriage 42 mounted upon suitable ways $42^a$ and having a table 46 mounted thereon for transverse movement. The table in turn may support a suitable tool holder 47 adapted to carry tools $c$ which in the longitudinal movement of the carriage serve to turn the outer periphery of the work A.

Also mounted upon the lathe, for movement transversely thereof in a plane somewhat below the axis of the work, is a rear tool carriage 50 carrying a table 52 adjustable in a direction longitudinally of the bed and in turn supporting a tool holder 54 which is adjustable transversely. As shown in Figs. 2 and 3, the carriage 50 is mounted to slide upon a plate 55 rigidly secured upon the body 11 and constructed to provide undercut ways 56 adapted to be engaged by gib-plates $56^a$ secured to the underside of the carriage at opposite sides thereof. Beneath the rear end of the plate 55, there is secured to the body 11 a gear housing $11^a$ having its upper end extending outwardly and upwardly to form with the plate 55 and the rear side of the body a chamber for enclosing the feed mechanism for the carriage 50, to be presently described.

The mechanism for moving the carriages 42 and 50 is arranged to be driven from a common actuating means including a shaft 57 mounted transversely in the body 11 (Fig. 2) and operatively connected with the spindle 13 by means of a chain and sprocket connection 58, change speed gears 59, a shaft 60, a worm 61, and a worm wheel 62, the latter being fast upon the forward end of the shaft 57.

The means for moving the carriage 50 is operatively connected with the rear end of the shaft 57 (Fig. 2) through the medium of a pair of spur gears 63, bevel gears 64 and a vertical shaft 65 journalled in the gear housing $11^a$. One of the gears 63 is fast upon the shaft 57 and the other is fast upon a countershaft $57^a$ which also carries one of the bevel gears 64, the other one of said bevel gears being fast upon the lower end of the shaft 65. Upon the upper end of the shaft 65 is made fast a crank arm 66 carrying a roller 67 operatively engaging with the carriage 50 through the medium of a depending portion 68 operating in an aperture $68^a$ in the plate 55. The depending portion 68 is constructed to provide a groove $67^a$ extending longitudinally of the bed, parallel with the work spindle (Fig. 4). It will be observed from Fig. 3 that the upper end of the shaft 65 projects into the chamber formed beneath the plate 55, which thus encloses the crank arm 66 and associated parts. Preferably the forward wall of the groove $67^a$ is provided with a hardened wear plate $67^b$.

The arrangement of the parts is such that when the carriage is in its normal or initial rearward position, the crank arm 66 extends in a general longitudinal direction with respect to the lathe bed (broken lines Fig. 4), and it will therefore be apparent that in the initial operation of the crank arm in a clockwise direction, the carriage 50 will be caused to move forwardly at a relatively high speed; but that as the crank arm approaches a transverse position (full lines Fig. 4) the rate of movement of the carriage is substantially reduced. I take advantage of this variation in the rate of movement of the carriage by mounting in the tool holder 54 a tool $a$ adapted in the present instance to face the closed end of the work (Fig. $1^a$) and which is so adjusted as to perform the major portion of its facing operation during the movement of the carriage at relatively high speed; and by also mounting in said tool holder a set of turning tools $b$ to perform operations requiring a slower rate of feeding movement, in the present instance the cutting of the grooves in the periphery of the piston.

The front carriage 42 is also actuated from the shaft 57 through the medium of suitable means, as, for example a pinion 69 and rack 70 (Fig. 1), the former being fast upon the shaft 57 and the latter rigid with the lower edge of the carriage. A block 71 is mounted for longitudinal adjustment at the lower edge of the carriage 42 in a groove 72 and has a forwardly projecting pin $71^a$ arranged to engage with a means for stopping the feeding operation at a predetermined point in the travel of the carriage. This means comprises a latch member 73 normally supporting the free end of a lever 74 pivoted at 75 and having rigid therewith an arm 76 which pivotally supports a bearing for the free end of the shaft 60 upon which the worm 61 is mounted. In said shaft is interposed a universal coupling 77 which, when the latch member 73 is engaged by the pin 71ª to release the lever 74, permits the worm 61 to disengage from the worm wheel 62.

It will be apparent that since the rear tool carriage is driven from the shaft 57 as is also the front tool carriage, when this tripping operation takes place, the entire feeding mechanism is brought to a stop.

But I find in practice that where accurate results are required the trip mechanism is not wholly dependable. In such cases I preferably adjust the parts so that the crank arm 66 occupies a position in dead center, at the extreme forward end of its throw, when the carriage 42 is in its foremost position. Thus, it will be seen, should the trip mechanism fail to operate at the proper time, the continued movement of the crank arm 66 will simply serve to move the carriage 50 slightly in the reverse direction, thus relieving the cutting tools $a$ and $b$.

To restore the parts to their initial position the common drive shaft 57 may be rotated through the medium of a hand wheel 78. In this operation, the crank, it will be observed, positively moves the carriage 50 rearwardly, no springs being employed as in the case of the common form of cam feed; and if it is desired, the carriage 50 may be moved beyond its normal rear position to an extreme rearward position by simply continuing the movement of the crank arm 66 to a position opposite that shown in full lines in Fig. 4.

The location intermediate the ends of the rear tool carriage 50 of the operative connection between it and the source of power, is advantageous, it will be observed, because it renders it practicable to support the extreme rear end of the carriage, which is not the case with feed mechanisms of the prior art, employing rear end cams.

As a means for adjusting the tailstock 17, the overarm 14 is preferably adjustable in the bearing 15 through the medium of rack teeth 93 formed upon the upper side of the overarm and a pinion 94 mounted in the headstock and operable by a cross bar 95 rigid therewith.

It will be apparent that the construction which I have provided for effecting the movement of the rear tool carriage first at a high speed and then at a relatively lower speed renders the lathe especially adapted for use in performing simultaneously a plurality of operations different in character: and that the overarm construction provided serves to support the work with sufficient rigidity as to enable the performance of a plurality of operations at the same time without resulting inaccuracies due to a springing of the work while under pressure. Moreover, the crank in operating through an arc of 180 degrees imparts to the rear tool carriage a movement twice the length of its throw. Therefore, as compared to the cams usually employed, the crank occupies a relatively small amount of space, and furthermore is capable of being manufactured at a much lower cost.

The general construction of the lathe herein illustrated is claimed in my application Serial No. 591,038, filed September 27, 1922.

I claim as my invention:

1. A lathe having means for rotatably supporting the work, means for feeding a plurality of tools into engagement with the work comprising a carriage having said tools mounted thereon, and means for moving the carriage initially at a relatively high speed and finally at a relatively slow speed, one of said tools being arranged so as to perform its cutting operation only during the slow feeding movement of the carriage.

2. A lathe having means for rotatably supporting the work, a carriage having a plurality of tools thereon, and means including a crank operatively associated with the carriage and adapted to move it first at one speed and then at another, one of said tools on the carriage being arranged to engage with the work while the carriage is travelling at one of said speeds only.

3. A lathe having means for rotatably supporting the work, a carriage, means for moving the carriage relative to the work including a shaft having a crank arm operatively associated with the carriage and arranged to be rotated to move the carriage initially at a relatively high speed and finally at a low speed, said carriage having a facing tool thereon operable during the movement of the carriage at either high or low speed, and a turning tool operable in the movement of the carriage at low speed only.

4. A lathe having, in combination, means to support and rotate the work, a carriage movable longitudinally of the work, a turning tool on said carriage, a tool holder mounted for movement transversely of the work, a tool on said tool holder, a common drive for said carriage and tool holder, a trip mechanism actuated in the movement of the carriage for throwing out said drive, and a connection between said tool holder and said drive adapted to reciprocate said tool holder, said reciprocating means being so arranged that upon failure of the trip mechanism to operate at the proper time the direction of movement of the tool holder will be reversed.

5. A lathe having a tool carriage, a housing having a plate closing its upper end, said plate having an aperture therein and said carriage having a portion depending through said aperture into the housing, and means enclosed within the housing operatively engaging with said depending portion of the carriage to move it relative to the work.

6. A lathe having a tool carriage, a body having a plate thereon projecting rearwardly therefrom and adapted to support said carriage, and means for moving the carriage comprising a vertical shaft, a housing secured upon the rear face of the body in which said shaft is journalled, said housing having its upper end constructed to form with said plate a chamber, and a member fast upon the shaft within said chamber and operatively associated with the carriage whereby to move it.

7. A lathe having a tool carriage with means providing a groove on its under side, feed mechanism comprising a crank arm having a roller at its free end adapted to engage in said groove, a trip mechanism for interrupting the feeding movement, and means for reversely operating the feed mechanism.

8. A lathe having, in combination, means to support and rotate the work, a carriage movable longitudinally of the work, a turning tool on said carriage, a tool holder mounted for movement transversely of the work, a tool on said tool holder, a common drive for said carriage and tool holder, a trip mechanism actuated in the movement of the carriage for throwing out said drive, and a connection between said tool holder and said drive including a crank arranged to reciprocate said tool holder, said crank being at dead center when the tool on the tool holder is nearest the work.

9. A lathe of the character described having a tool carriage, and means for moving the carriage first at a relatively high speed and finally at a low speed, said means comprising a crank arm operatively associated with the carriage, the arrangement being such that in the initial movement of the arm it swings from a position extending transversely of the direction of movement of the carriage and in its final movement it swings into a position substantially parallel with the movement of the carriage.

10. A lathe having, in combination, means to support and rotate the work, a tool holder mounted for movement transversely of the work, a tool on said tool holder, a drive for the tool holder, a trip mechanism for throwing out said drive, and a connection between said tool holder and said drive adapted to reciprocate said tool holder, said reciprocating means being so arranged that upon failure of the trip mechanism to operate at the proper time the direction of movement of the tool holder will be reversed.

11. A lathe having, in combination, means to support and rotate the work, a tool holder mounted for movement transversely of the work, a tool on said tool holder, a drive for said tool holder, a trip mechanism for throwing out said drive, and a connection between said tool holder and said drive including a crank arranged to reciprocate said tool holder, said crank being at dead center when the tool is nearest the work.

12. A lathe having, in combination, a rear tool carriage mounted for transverse movement, a horizontal transverse shaft connected with a source of power, a countershaft, spur gears connecting said shafts, a vertical shaft, bevel gears connecting the vertical shaft to the countershaft, a housing providing a bearing for said vertical shaft and enclosing the gears, said housing being constructed to provide a chamber beneath said carriage, and means on the upper end of said vertical shaft operatively associated with said carriage to reciprocate it.

13. A lathe having a hollow body providing a bed, a carriage mounted for sliding movement on said bed, a horizontal shaft connected with a source of power mounted in said body transversely thereof, the rear end of the shaft projecting from the body, a vertical shaft operatively connected with said horizontal shaft, a housing on the rear side of said body and adapted to provide a bearing for said vertical shaft and enclose the connection between it and the horizontal shaft, said housing being constructed to provide a chamber beneath said carriage, and means on the upper end of said vertical shaft operatively associated with said carriage to move it.

In testimony whereof, I have hereunto affixed my signature.

GUSTAF DAVID SUNDSTRAND.